United States Patent
Narasappa

(10) Patent No.: US 9,210,046 B2
(45) Date of Patent: Dec. 8, 2015

(54) ZONE-BASED NETWORK TRAFFIC ANALYSIS

(75) Inventor: Sumanth Narasappa, Karnataka (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 1218 days.

(21) Appl. No.: 13/046,848

(22) Filed: Mar. 14, 2011

(65) Prior Publication Data

US 2012/0239796 A1    Sep. 20, 2012

(51) Int. Cl.
*H04L 12/28* (2006.01)
*H04L 12/24* (2006.01)
*H04L 12/751* (2013.01)

(52) U.S. Cl.
CPC .............. *H04L 41/12* (2013.01); *H04L 41/142* (2013.01); *H04L 45/02* (2013.01)

(58) Field of Classification Search
CPC ............. H04J 3/08; H04B 7/14; G06F 15/173
USPC ........................ 370/223–330; 709/223–224
See application file for complete search history.

(56) References Cited

U.S. PATENT DOCUMENTS

| | | | |
|---|---|---|---|
| 6,377,542 B1* | 4/2002 | Asprey ........................ | 370/222 |
| 7,200,122 B2* | 4/2007 | Goringe et al. ............... | 370/255 |
| 7,423,979 B2* | 9/2008 | Martin .......................... | 370/255 |
| 2004/0221296 A1* | 11/2004 | Ogielski et al. ............... | 719/313 |
| 2005/0271038 A1* | 12/2005 | Xin et al. ...................... | 370/351 |
| 2006/0004917 A1 | 1/2006 | Wang et al. | |
| 2006/0056328 A1* | 3/2006 | Lehane et al. ................ | 370/315 |
| 2006/0072554 A1 | 4/2006 | Farahmand et al. | |
| 2007/0223512 A1 | 9/2007 | Cooper et al. | |

OTHER PUBLICATIONS

Jeong, Yeonkwon et al., "Zone-Based Service Architecture for Wireless Ad Hoc Networks", GESTS Int'l Trans. Computer Science and Engr., vol. 18, No. 1, Oct. 2005, pp. 73-84.
Mieghem, Piet Van "Dividing a Network Into Peer Groups to Build a Hierarchical Structure", Alcatel Corporate Research Francis Wellesplein 1, B-2018 Antwerp (Belgium), pp. 1-4. Mar. 1999.

* cited by examiner

*Primary Examiner* — David Lazaro
*Assistant Examiner* — Zia Khurshid
(74) *Attorney, Agent, or Firm* — Mannava & Kang P.C.

(57) ABSTRACT

Network discovery is performed to detect routers and to collect discovery data from them. The discovery data is analyzed to identify zones, i.e., autonomous routing domains and subdomain areas. Network traffic is monitored at border router ports to obtain zone traffic data. The zone traffic data is analyzed to evaluate per-zone or inter-zone traffic parameters.

13 Claims, 5 Drawing Sheets

ZONE-BASED NETWORK TRAFFIC ANALYSIS

BACKGROUND

Network traffic can be monitored and analyzed for several purposes including evaluating network health of a network and trouble-shooting problems. Many routers provide for selectively monitoring inter-node traffic on a per port (interface) basis. Network management systems can provide tools for analyzing the traffic at a given node (host server or network infrastructure device, e.g., router) and between pairs of nodes.

BRIEF DESCRIPTION OF THE DRAWINGS

The following figures represent examples or implementations of the invention and not the invention itself.

DETAILED DESCRIPTION

Figure 1:
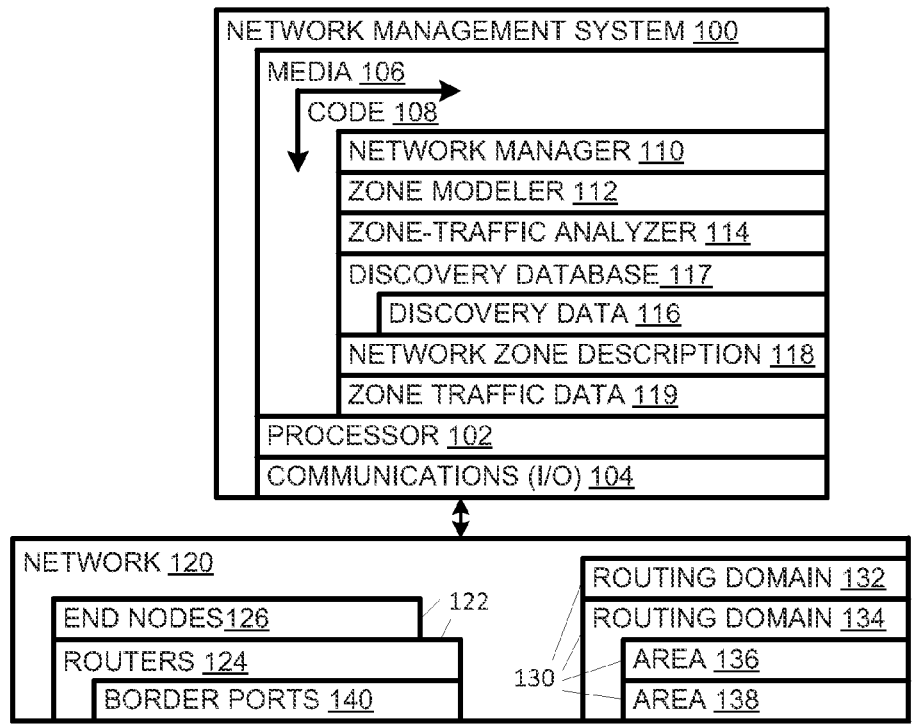
FIG. 1 is a schematic diagram of a network and a network management system.

A network management system 100, shown in FIG. 1, provides for 1) discovering network zones including routing domains (autonomous systems) and subdomain areas; and 2) analyzing network traffic on a per-zone and/or inter-zone basis. Since there are many fewer zones than nodes, a relatively coarse-grained zone-based description of traffic in a large hierarchically structured network can be easier to grasp than a relatively fine-grained node-based description. The zone-based description can facilitate such tasks as network health evaluations and trouble-shooting. Where desirable, a zone-based description can be "zoomed in"; in other words, a node-based description can be developed for a zone determined to be of interest in the course of the zone-based analysis.

Figure 2:
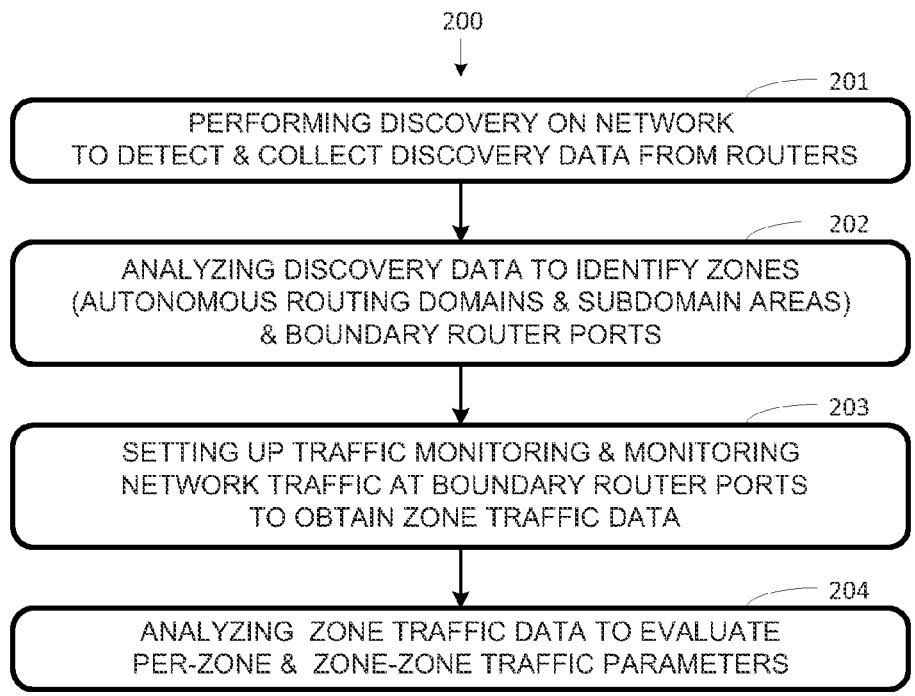
FIG. 2 is a flow chart of a process implemented by the network management system of FIG. 1.

Network management system 100 is a computer including a processor 102, communications (including input/output) devices 104, and computer-readable storage media 106. Media 106 is encoded with code 108 defining functionality for a network manager 110, a zone modeler 112, and a zone-traffic analyzer 114. When executed by processor 102, code 108 provides for an implementation of a process 200, flow charted in FIG. 2.

At 201, network manager 110 performs discovery on a network 120 having nodes 122 including routers 124 and end nodes 126 (computers, peripherals, etc.). In the course of discovery, discovery data 116 is collected from routers 124 and stored in a discovery database 117 of system 100. Discovery data 116 is analyzed at 202 by zone modeler 112 to develop a network zone map or description 118. Description 118 identifies: 1) zones 130 including routing domains (aka "autonomous systems" or "AS") 132 and 134 and subdomain areas 136 and 138; and 2) zone-border router ports 140. At 203, network manager 110 configures border router ports 140 to monitor network traffic data, and network manager 110 collects the resulting network traffic data 119.

At 204, zone-traffic analyzer 114 analyzes the collected network traffic data to evaluate per-zone and inter-zone traffic parameters. The results of the zone-based network traffic analysis can be useful in visualizing traffic density distributions in networks, in auto-configuring flow collection, probes in a network for trouble-shooting, analyzing impacts on end nodes and applications by analyzing network performance at border ports, and estimating zone performance using traffic densities and port utilization.

In case netflow or any other flow collection is enabled in a network, the flow exports have the source address. A map of the traffic densities can be drawn and the inter-zone traffic can also be drawn using the host-to-zone associations. For each zone, a set of border routers are present; for each link, network manager 110 can enable flow collection at border router ports enabled; also, network manager 110 can configure probes (such as IPSLA tests in the case of Cisco routers) to monitor network health automatically. Each zone is 'supported' by a set of border router interface ports and links; any degradation of the link performance will have impact on the hosts in the zone. Using statistical methods, it is possible to estimate the impacts on zone performance when the number of hosts in a zone is increased.

Herein, a "zone" can be a routing domain (i.e., autonomous system or AS) or a subdomain area of a routing domain. Communications between autonomous routing domains employ an exterior gateway protocol such as BGP (Border Gateway Protocol) or, more specifically, eBGP (external BGP). Each routing domain employs an interior gateway protocol, e.g., OSPF (Open Shortest Path First), IS-IS (Intermediate System to Intermediate System), RIPv2 (Routing Information Protocol version2), IGRP (Interior Gateway Routing Protocol), (Enhanced Interior Gateway Routing Protocol), iBGP (internal BGP). Some interior gateway protocols, e.g., OSPF and IS-IS, are hierarchical in the sense that they permit separate subdomain areas to be defined within a routing domain; some other interior gateway protocols are non-hierarchical, i.e., they do not provide for separate subdomain areas to be defined within a routing domain.

Herein, "router" refers to network infrastructure devices such as routers, switches, and bridges, that selectively route communications; "router" excludes network infrastructure devices such as hubs and repeaters that route, but not selectively. A typical router includes two or more network interface ports. Some routers are limited to a single routing protocol; for example, an IS-IS Level 1 router may be limited to the IS-IS protocol on all ports. In other cases, a router may support more than one protocol, e.g., an Interior Gateway Protocol and an Exterior Gateway Protocol. Ports enabled for an exterior gateway protocol can be presumed to be routing-domain border ports.

For interior gateway protocols that support subdomain areas, system 100 provides protocol-specific procedures for identifying areas, included nodes, and area border ports. In some cases, an area border port can be identified using data obtained from its host router; in other cases, data obtained from another router including a port (connected to the port of interest) can be used with data from the host router to identify a border port.

Figure 3:
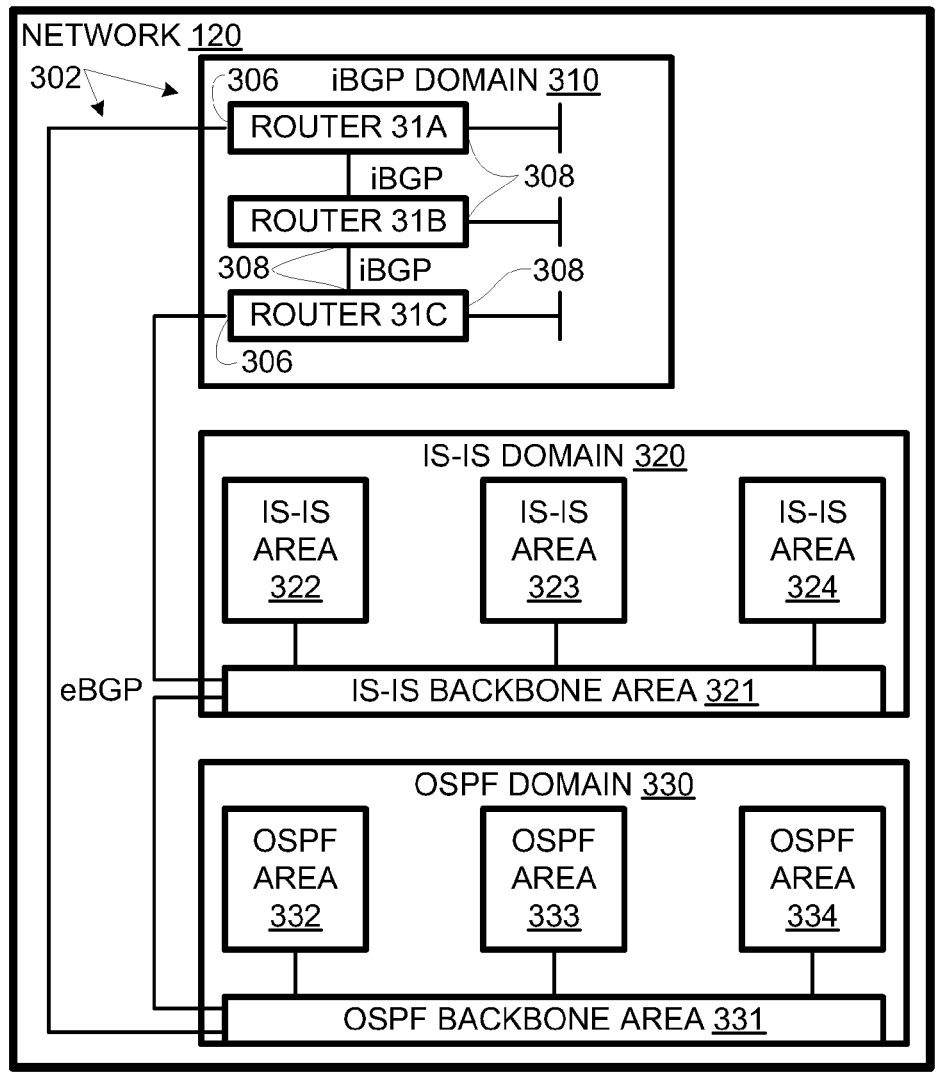
FIG. 3 is a detail of the network of FIG. 1.

Network 120, as shown in FIG. 3, includes zones 302 in the form of routing domains and subdomain areas. The routing domains include a iBGP domain 310, an IS-IS domain 320, and an OSPF domain 330. IS-IS domain 320 includes an IS-IS backbone area 321, and branch areas 322, 323, and 324; OSPF domain 330 includes a backbone area (area zero) 331, and branch areas 332, 333, and 334. Domains 310, 320, and 330 communicate with each other using eBGP; ports 316 are routing domain border ports 318 are interior (non-border) ports. IBGP domain 310 employs an iBGP routing protocol internally. IS-IS domain 320 employs an IS-IS routing protocol internally. OSPF domain 330 employs an OSPF protocol internally. In other examples, other external gateway protocols and other internal gateway protocols can be used.

Figure 4:
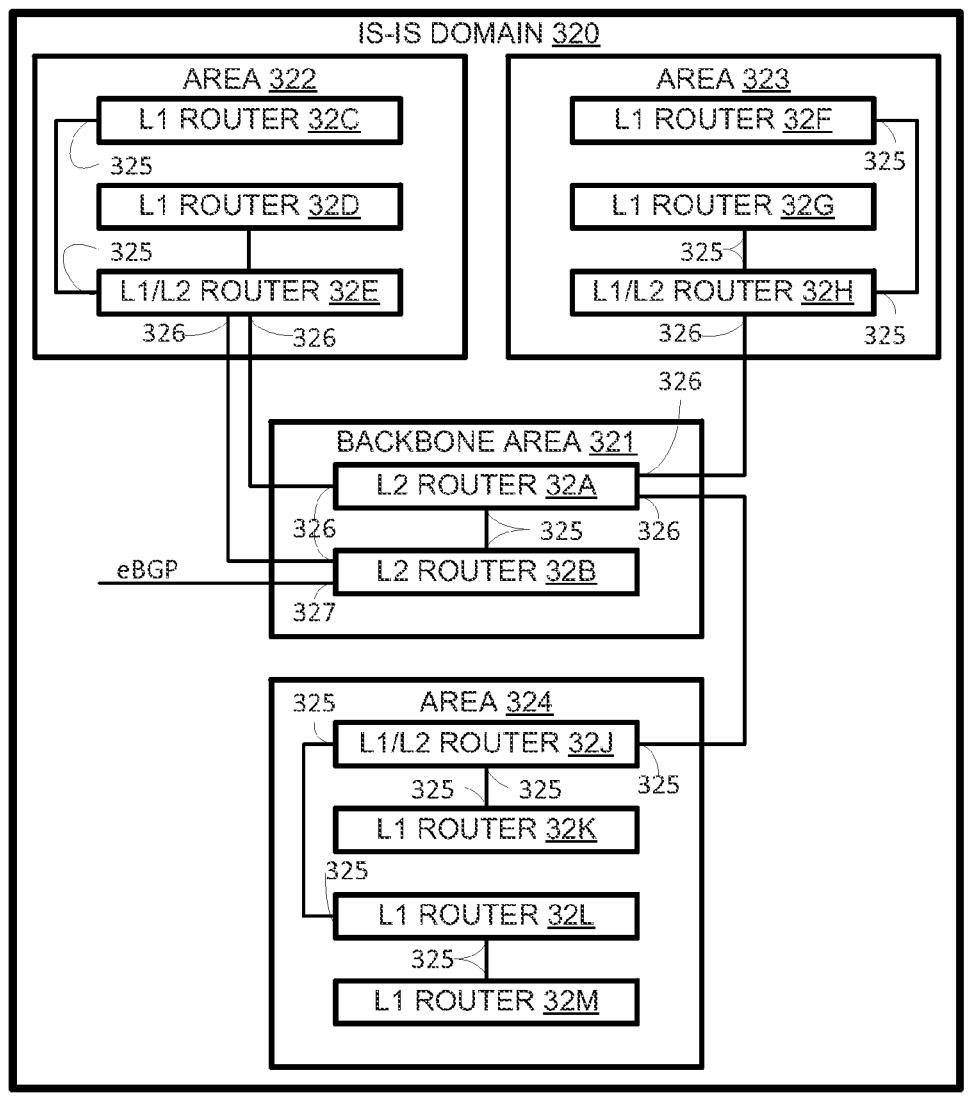
FIG. 4 is a detail of an IS-IS domain of the network of FIG. 3.

A more detailed view of IS-IS domain 320 is given by FIG. 4. An IS-IS domain router can be an intra-area level one (L1) router, or a backbone level two (L2) router, or an L1/L2 router that connects a non-backbone area to a backbone area. Backbone area 321 includes L2 routers 32A and 32B. Area 322 includes L1 routers 32C and 32D and an L1/L2 router 32E. Area 323 includes L1 routers 32F and 32G and an L1/L2 router 32H. Area 324 includes L1 routers 32K, 32L, and 32M and an L1/L2 router 32J as shown. Note that L1/L2 are typically arranged as area border routers, e.g., they may include interior ports 325, and area border ports 326; L2 routers can be arranged as area border routers and domain border routers, e.g., they may have interior ports 325, area border ports 326, and domain border ports 327. L1 routers are not configured as area border or domain border routers, but include interior ports 325.

Figure 5:
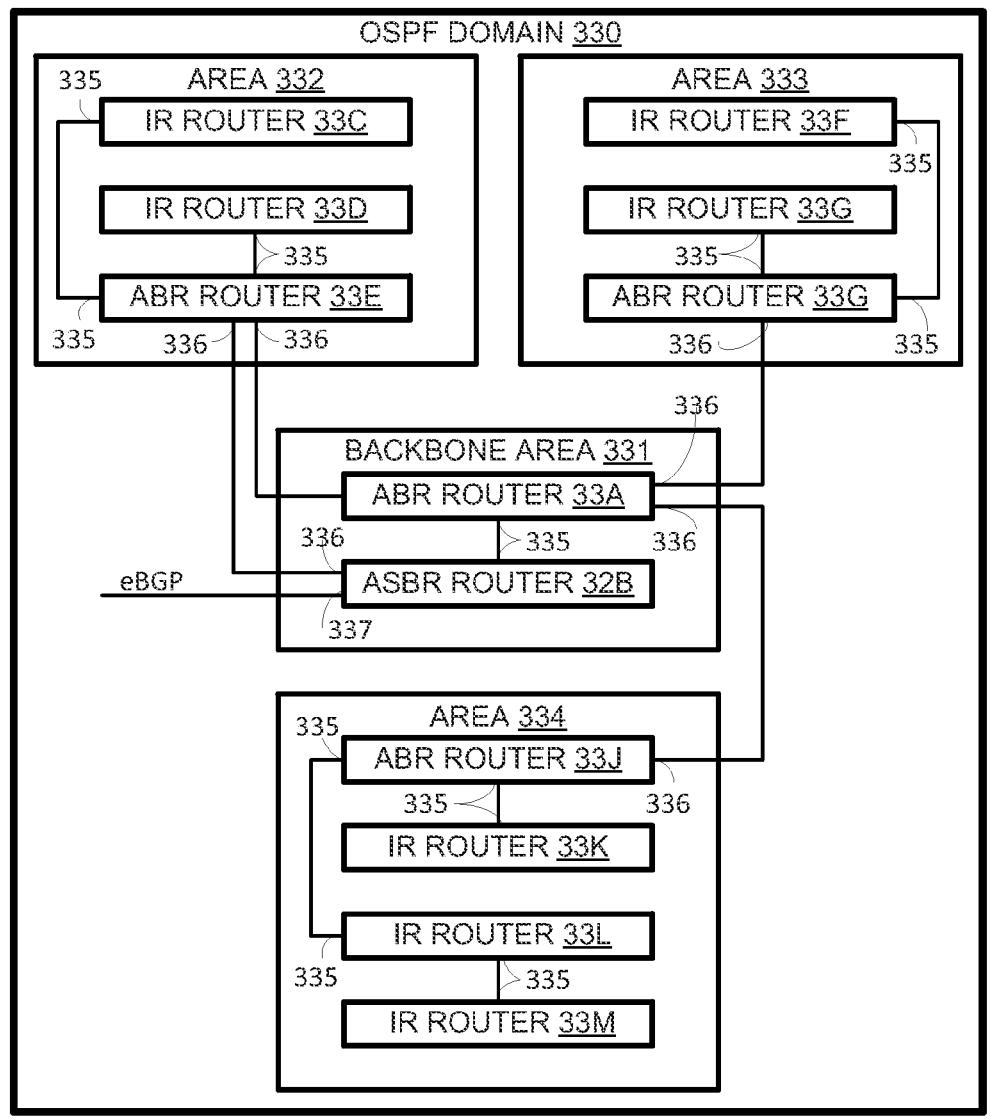
FIG. 5 is a detail of an OSPF domain of the network of FIG. 3.

A more detailed view of OSPF domain 330 is presented in FIG. 5. An OSPF domain can include internal routers (IR), area border routers (ABR) and autonomous system border routers (ASBR). Routers that connect to an OSPF backbone are backbone routers (BR). Backbone routers can also be IR, ABR, or ASBR routers. Backbone area 331 includes an ABR router 33A and an ASBR router 32B. Area 332 includes IR routers 33C and 33D and an ABR router 33E. Area 333 includes IR routers 33F and 33G and an ABR router 33G. Area 334 includes IR routers 33K, 33L, and 33M, as well as an ABR router 33J. IR routers include interior ports 335; ABR routers may include interior ports 335 and area border ports 336; and ASBR, i.e., domain border, routers can include interior ports 335, area border ports 336, and domain border ports 337.

Figure 6:
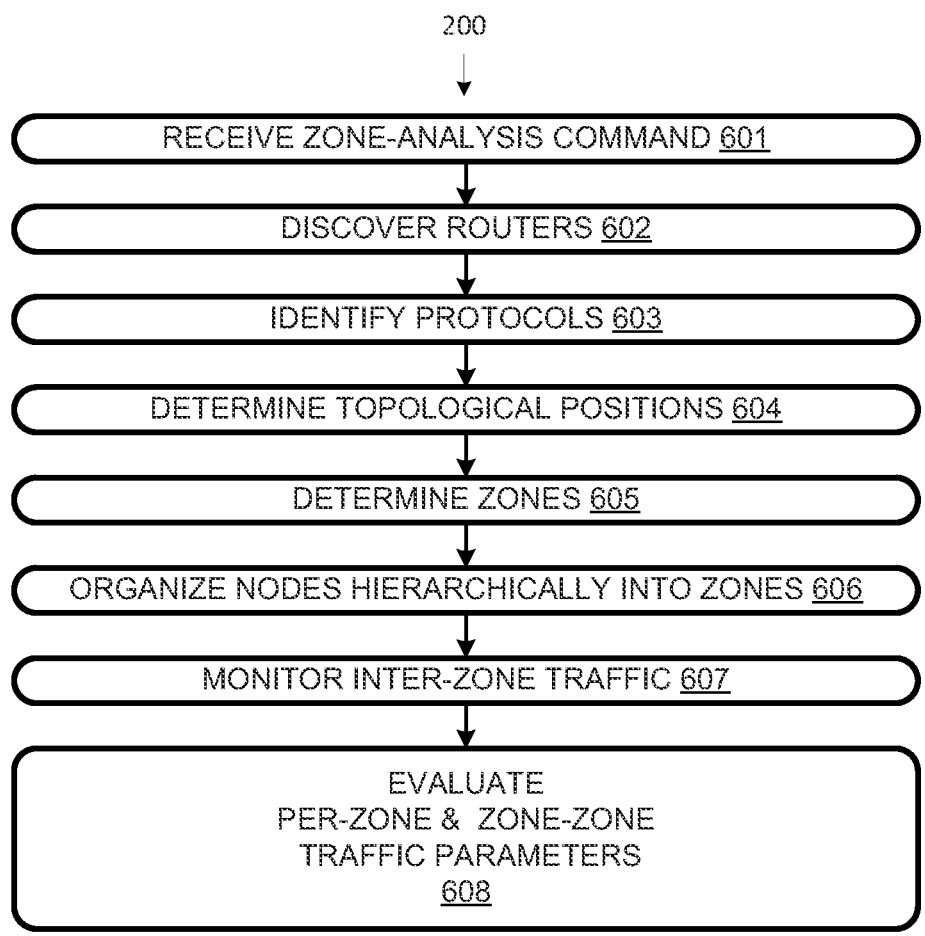
FIG. 6 is a detail of the process of FIG. 2.

Process 200 is further broken down in FIG. 6. At 601, network manager 100 receives a zone-analysis command. Items 602-608 are automatically performed in response to this command. At 602, routers are detected. At 603, the routing protocols employed by the routers are determined, either on a per-router or per-port basis if the ports can support different protocols. At 604, the topological positions (e.g., internal, area border, domain border) of routers are determined. At 605, zones are identified in part from the information regarding the topological positions. At 606, nodes (e.g., computers and routers) are organized hierarchically into zones (e.g., routing domains and subdomain areas). At 607, inter-zone traffic is monitored. At 608, per-zone and inter-zone traffic parameters are evaluated based on the inter-zone traffic data.

While they are physically defined, e.g., by configurations encoded in routers, zones 302 are not necessarily known to a network administrator. For example, each domain and even each area may be separately administered, with no zone (e.g., site) administrator having a view of the entirety of network 300. Process 200 can be used to identify zones 302 through discovery. The discovery performed at 201 can detect routers and return their identifiers and any interior or exterior gateway protocols enabled at the routers' ports.

When network manager 110 discovers a router, it tests for the following management information databases: OSPF, IS-IS or BGP enabled. Network manager 110 then gets the router ID (e.g., the loopback interface ID).

In a case that a router employs BGP, the following procedure can be used to identify zones and border ports. The routing domain, i.e., autonomous system (AS), to which the router belongs can be obtained by querying the OID bgpLocalAs[1.3.6.1.2.1.15.2]. The BGP identifier for the router can be obtained from bgpIdentifier[1.3.6.1.2.1.15.4]. One can define a zone with the same name as the AS number and associate the router identifiers.

A set of peers for this BGP interface can be obtained by querying theOID bgpPeerIdentifier[.1.3.6.1.2.1.15.3.1.1]. The peers can be within the same AS or different AS. To check if the peer AS is remote we can query bgpPeerRemote.As [.1.3.6.1.2.1.15.3.1.9] this will, return the AS number of the peer. In case the peer belongs to the same AS, it is iBGP enabled. In case the peer belongs to a different AS, it is eBGP enabled. The interface is marked to indicate whether it speaks iBGP or eBGP. Using connectivity info and router adjacencies, the domains are discovered. In case all the BGP-enabled interface ports are in the same AS, the router is an "internal" router; and, in case any of the BGP speaks eBGP, the router is a domain border router.

In large networks that use iBGP internally, the private AS numbers 64512 through 65534 may be used in such a case each AS is a zone. Here each AS is a zone. At this point, the procedure has identified a set of internal routers (interfaces) and exterior routers for a zone.

In a case of a service provider, the procedure for identifying network zones may vary. Each POP (Point of Presence) can be considered as a zone. Classification can follow the following procedure. 1) Query the VRF (Virtual Routing and Forwarding) table mplsVpnVrfName [1.3.6.1.3.11.8.1.2.2.1.1]) to determine if there are VRFs configured. 2) The interface at which the VRFs are present are the PE (Provider Edge) interfaces. 3) The PE interfaces on a particular PE node are all marked into a zone (POP site).

In the case that the router is enabled for IS-IS, the IS-IS management information database [1.3.6.1.3.37] can be used in the following procedure. (Cisco has a very similar MIB which can also be used for Cisco devices CISCO-IETF-ISIS-MIB[1.3.6.1.4.1.9.10.118].)

1. For every router in the network, check if IS-IS routing is used isisSysID[1.3.6.1.3.37.1.1.1.4], this also gets the router id for the router. This ID can be stored in discovery database 117.

2. The zone to which each router belongs is determined.

3. If the zone matches a zone represented in database 117, the router ID is associated with the existing zone ID in database 117; otherwise, a new zone is defined in database 117, and the router ID is associated with the new zone ID.

4. All adjacent routers are obtained by querying the OID (Object Identifier), isisISAdjEntry[1.3.6.1.3.37.3.1.1]. The router sysids so obtained are compared with the routers already in database 117, which stores the sysids of the adjacent routers.

5. The type of router running ISIS is also known by querying isisISAdjNeighSysType[1.3.6.1.3.37.3.1.1.6]. In case all routers adjacent to this router is L1 router then all are marked "L1" and stored within the same area.

6. The adjacent neighbor isisISAdjNeighSysID is also known and cross checked by querying the sysid of the adjacent router.

The result of the IS-IS procedure is a set of routers marked L1, L2 or L1/L2 and the areas they belong to. Each area is a zone and is represented in database 117 along with the area ID being used as the zone name. Also the adjacencies for each area have been determined.

For Cisco devices which support CISCO-IETF-ISIS-MIB [1.3.6.1.4.1.9.10.118], a procedure modeled after the foregoing can be used to get same information and to identify subdomain areas.

OSPF domains, e.g., OSPF domain 330, can be identified and characterized using the following procedure.

1. To determine if OSPF is enabled, query the MIB OID ospfRouterId [1.3.6.1.2.1.14.1.1]. If this is present, then the router is capable of OSPF and using OSPF on interfaces. Also, to check if OSPF is active, query ospfAdminStat [1.3.6.1.2.1.14.1.2]

2. In case OSPF is enabled on the interface ports, check if this is an Area Border Router(ABR)ospfAreaBdRtrStatus [1.3.6.1.2.1.14.1.4]. If so, mark this as ABR in database 117.

3. In case OSPF is not enabled, check if this is an Autonomous System Border Router (ASBR) ospfASBdrRtrStatus [1.3.6.1.2.1.14.1.5].

4. Determine if this is an internal router (IR), i.e., has all of its interface ports within the same area.

5. Get the area ID of this router by querying ospfAreaId [1.3.6.1.2.1.14.2.1.1]; store this ID in database 117.

6. Get the kind of area this router supports ospfImportAsExtern[1.3.6.1.2.1.14.2.1.3]:
   a. importExternal exports to external AS
   b. importNoExternal indicates a "stub" area
   c. importNssa indicates a "not-so-stubby" area 7. In case a stub area is indicated, get the area ID ospfStubAreaId[1.3.6.1.2.1.14.3.1.1]

8. Determine hosts-to-area relationship:
   a. When a node which is not a router is discovered by network manager 110, connectivity info is also derived by network manager 110, which can obtain and analyze connectivity information for a non-router host to determine the area to which it belongs.
   b. A traceroute can be run along the path to check for the ABRs or the internal routers. The first internal router to which the hosts is connected belongs to the same area as that of the internal router, as is commonly the case in an enterprise network.
   c. In case of a service-provider network, there may not be any hosts. However, each POP site may have multiple routers receiving information from the customer edges (CEs).

9. Each area with a set of internal routers, ABRs and connected hosts are stored as a zone and the area ID is stored as the zone ID in database 117 for every network node. The backbone routers are also marked and their connected interface ports are also stored in database 117.

10. For the ASBR router interface ports, the AS to which they belong and all reachable (neighbor) ABSRs are marked. The neighbor ASBRs may be PE edges of service providers in case of an enterprise network.

At the end of this OSPF procedure, domain 330 is described in terms of (area) zones. The zone name is same as that of the area. For each zone, the following are stored in the database. For hosts, the identities of the zone, the area border router, and the immediate internal router. For internal routers, the identities of the area border routers are indicated. For area border routers, the set of interface ports and the identities of the areas to which they connect. For ASBRs, the area ID and the reachable ASBRs are identified in database 117.

There are other ways to divide the network into zones. For example, subnets can be treated as subdomain areas in case flat addressing schemes are used. Also, NAT (Network Address Translation) boundaries can be used to zone the network. In case of adjacency failures or changes the router sends, traps are sent to network manager 110 and zone modeler 112 will reanalyze discovery data 116 to determine the zones.

Database 117 can be used to develop a zone map to provide a pictorial, representation of the zone hierarchy. Flow collection (Netflow, sFlow . . . ) can be enabled at the border routers. Flow collection is enabled mostly at the border routers like ASBRs or ABRs. A flow consists of a set of fields like Source IP, Destination IP protocol. A set of flows from source to destination may be referred to as a "conversation".

Once the zones are discovered and hosts are associated with the zones, the flow data which has the appropriate source/destination IP addresses can be aggregated and be displayed on the zone map. This gives the overall view of the network health with different zones and allows the network administrators to determine which zones are heavy users of the network.

Since there may be thousands of conversations, displaying conversations per host/IP may not be helpful. Visualization can be achieved on an intermediate level, finer than domain-based and coarser than node-based characterizations. Debugging network issues may be facilitated since the network administrators can focus on certain zones in the network not the entire network. In a case of a service provider network, this can be very helpful in understanding the "Point of Presence" (POP) sites generating more traffic and planning.

Classification of routers based on the functionality aids choosing points in the network to configure the flow data collection or configuring the test probes. In a large network, collection of flow data is enabled at various points like the distribution edge. Similarly to measure the network performance, IP SLA tests or probes can be deployed in different points in a network to provide measures like Round Trip Time (RTT), Jitter, Packet Loss, MOS ("Mean Opinion Score", a parameter used for determining voice quality).

Probes can be limited to zones that are connected via WAN links. In case of VoIP deployed networks, the VoIP based tests can be established between the zones (specifically between the gateways). Here understanding the topology from network manager 110 as well as the logical zones can assist in setting up the tests to gather performance data.

Once flow collection is enabled, for every interface in border routers which talk to different zones, the traffic 'conversations' can be baselined; in other words, taking a set of samples to compute a "baselined" value, for example, by computing the average; a true baseline can apply Holt's Winter's Method also known as Triple Moving Average to arrive at the baselined value. For example, assume hosts in zone 320 talks mostly to zone 330 and mostly it is SAP traffic (mission critical); in such a case, the probes to be configured will be from zone 310 to zone 330. TCP Connect is used to give the transaction time metrics. (There is little value in configuring the RTT tests just to get the round-trip time.) This allows: 1) picking the right kind of test for getting the performance; and 2) avoiding having to test for all pairs of zones.

By associating hosts to zones, it is possible to know which links and interface ports are important for a given site; this in turn makes it possible to find out how interface/link performance affects the hosts. In case the flow collection is enabled on interface ports, it is also possible to know the applications/services impacted. In case of stub areas, if there is a link failure, then the entire zone connectivity is lost; also, in case of primary link failure to the zone, the host's performance may be degraded. Since network manager 110 is aware of the hosts and the associated interfaces for a zone, network manager 110 can generate incidents for impacted hosts, e.g., when the interface/link utilization is high (e.g., greater than 75%).

For a given zone, the set of hosts are known; also for a period (e.g., a month), the utilization of links is also known. In such a case, simple statistical methods (e.g., employing Little's Law) can be applied to understand the impacts on link utilization as well as the overall health of the site when the number of hosts is increased or the host generates more traffic. Inter-zone performance is mainly based on parameters such as link utilization, using statistical methods like triple average moving model (to include the 'seasonality' effect of peak hour usage/non-peak hour usage). It is possible to predict the impact on hosts when the utilization reaches a particular level. Analytical models can be constructed using the links at the border routers, and, using methods such as moving average, it is possible to predict the performance of the network.

In the case of a network manager that has scalability issues, in managing the entire topology in a single station, the zoning data can help the network manager to establish distributed collection stations to manage the network. In such a case, distributed collection stations can collect discovery data. Alternatively, metrics data can be used to decide which portions of the network are to be monitored by which station. One of the factors in mapping stations to zones can be the station locations within the network.

Herein, a "system" is a set of interacting non-transitory tangible elements, wherein the elements can be, by way of example and not of limitation, mechanical components, electrical elements, atoms, physical encodings of instructions, and process segments. Herein, "process" refers to a sequence of actions resulting in or involving a physical transformation. "Storage medium" and "storage media" refer to a system including non-transitory tangible material in or on which information is or can be encoded so as to be readable by a computer.

Herein, a computer is a machine having co-located or distributed hardware components including computer-readable storage media, a processor, and one or more communications devices. The media stores or is configured to store code representing data including computer-executable instructions. The processor, which can include one or more central-processing units (CPUs), reads and manipulates data in accordance with the instructions. "Communication(s) device(s)" refers to computer-hosted devices used to transmit and/or receive data. Herein, a "computer network" is a network of communicatively coupled real and, in some cases, virtual nodes, wherein the nodes can be, by way of example and not of limitation, servers, network infrastructure devices, and peripherals. Herein, "node" encompasses real and virtual devices.

In this specification, related art is discussed for expository purposes. Related art labeled "prior art", if any, is admitted prior art. Related art not labeled "prior art" is not admitted prior art. In the claims, "said" qualifies elements for which there is explicit antecedent basis in the claims; "the" refers to elements for which there is implicit antecedent basis in the claims; for example, the phrase "the center of said circle" indicates that the claims provide explicit antecedent basis for "circle", which also provides as implicit antecedent basis for "center" since every circle contains exactly one center. The illustrated and other described examples and implementations, as well as modifications thereto and variations thereupon are within the scope of the following claims.

What is claimed is:

1. A process comprising:
    performing, by a computer, discovery on a network to detect and collect discovery data from a plurality of routers;
    analyzing, by the computer, the discovery data to identify zones including autonomous routing domains and subdomain areas;
    analyzing, by the computer, the discovery data to identify border router ports;
    in response to identification of said border router ports, configuring, by the computer, said border router ports to monitor network traffic through the border router ports;
    obtaining, by the computer, the monitored network traffic from said border router ports to obtain network traffic data; and
    analyzing, by the computer, said network traffic data to evaluate per-zone or inter-zone traffic parameters.

2. The process as recited in claim 1, wherein said discovery involves identifying protocols used by said routers.

3. The process as recited in claim 2, wherein said protocols include at least one routing protocol selected from a set consisting of an OSPF protocol and an IS-IS protocol, said zones including subdomain areas defined by the selected routing protocol.

4. The process as recited in claim 1, wherein said analyzing discovery data involves distinguishing internal routers internal to an area, border routers arranged for inter-area communications, and border routers arranged for communications between routing domains.

5. The process as recited in claim 4, wherein said border routers employ an eBGP routing protocol.

6. A computer comprising:
    a processor;
    a non-transitory media encoded with machine readable instructions that, when executed by a processor, cause the processor to:
        collect discovery data from a plurality of routers,
        analyze the discovery data to identify border router ports;
        in response to identification of border router ports, configure said border router ports to monitor network traffic through the border router ports;
        obtain the monitored network traffic from the border router ports to obtain network traffic data between zones; and
        analyze said network traffic data between said zones to evaluate per-zone or inter-zone traffic parameters.

7. The computer as recited in claim 6, wherein said discovery data includes data indicating routing protocols enabled at ports of said routers.

8. The computer as recited in claim 7, wherein the machine readable instructions are further to cause the processor to identify those of said router ports that are border ports, said border router ports including routing-domain border ports and subdomain area border router ports of said routers.

9. The computer as recited in claim 7, wherein the machine readable instructions are further to cause the processor to identify router ports having at least one enabled routing protocol selected from a set consisting of OSPF and IS-IS.

10. A non-transitory computer readable storage medium on which is stored machine readable instructions that when executed by a processor cause the processor to:
    perform network discovery so as to detect routers having interface ports and routing protocols enabled at each of the network interface ports of the routers;
    analyze results of said network discovery to identify zones, said zones including routing domains and subdomain areas;
    analyze the results of said network discovery to identify border router ports;

in response to identification of said border router ports, configure said border router ports to monitor network traffic through the border router ports;

obtain the monitored network traffic from said border router ports to obtain network traffic data; and analyze said network traffic data to evaluate per-zone or inter-zone traffic parameters.

11. The non-transitory computer storage readable medium as recited in claim 10, wherein said subdomain areas are defined by router ports enabled for at least one routing protocol selected from a set consisting of OSPF and IS-IS.

12. The non-transitory computer readable storage medium as recited in claim 10, wherein said routing domains are defined by routing ports enabled for an eBGP routing protocol.

13. The non-transitory computer readable storage medium as recited in claim 10, wherein the machine readable instructions are further to cause the processor to:

selectively set up traffic monitoring at area border and routing domain border router ports to enable capture of zone traffic data; and analyze said zone traffic data to evaluate per-zone or inter-zone traffic parameters.

* * * * *